United States Patent
Okada et al.

(10) Patent No.: US 10,139,588 B2
(45) Date of Patent: Nov. 27, 2018

(54) IMAGING LENS AND OPTICAL APPARATUS

(71) Applicant: FUJIFILM Corporation, Tokyo (JP)

(72) Inventors: Kazuyoshi Okada, Saitama (JP); Takashi Kunugise, Saitama (JP); Yasunobu Kishine, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/696,216

(22) Filed: Sep. 6, 2017

(65) Prior Publication Data
US 2018/0088299 A1    Mar. 29, 2018

(30) Foreign Application Priority Data

Sep. 29, 2016 (JP) ................................. 2016-191322

(51) Int. Cl.
*G02B 7/10* (2006.01)
*G02B 9/64* (2006.01)
*G02B 13/04* (2006.01)

(52) U.S. Cl.
CPC ................. *G02B 7/10* (2013.01); *G02B 9/64* (2013.01); *G02B 13/04* (2013.01)

(58) Field of Classification Search
CPC ............. G02B 7/10; G02B 13/04; G02B 9/64

USPC .................................................. 359/642, 648
See application file for complete search history.

(56) References Cited

U.S. PATENT DOCUMENTS 7,173,777 B1 * 2/2007 Lu .......................... G02B 13/06
359/642

FOREIGN PATENT DOCUMENTS

JP           2016-024344 A      2/2016

* cited by examiner

*Primary Examiner* — Tuyen Tra
(74) *Attorney, Agent, or Firm* — Studebaker & Brackett PC

(57) ABSTRACT

The imaging lens includes a first lens group fixed during focusing and a positive second lens group moving to an object side during focusing from a long-distance object to a short-distance object, in order from a side closest to the object. The field curvature is adjusted by moving the first lens group or a sub-lens group within the first lens group including a lens closest to the object side, as an adjustment group. A stop fixed during the adjustment of the field curvature is disposed closer to an image side than the adjustment group. Conditional expressions relating to the focal length of the whole system, the focal length of the adjustment group, and the height of a paraxial on-axis light ray in the adjustment group are satisfied.

13 Claims, 12 Drawing Sheets

EXAMPLE 1

EXAMPLE 1

EXAMPLE 2

EXAMPLE 4

EXAMPLE 5

EXAMPLE 1

EXAMPLE 3

EXAMPLE 5

IMAGING LENS AND OPTICAL APPARATUS

BACKGROUND OF THE INVENTION

CROSS-REFERENCE TO RELATED APPLICATIONS

The present application claims priority under 35 U.S.C. § 119 to Japanese Patent Application No. 2016-191322, filed on Sep. 29, 2016. The above application is hereby expressly incorporated by reference, in its entirety, into the present application.

1. Field of the Invention

The present invention relates to an imaging lens and an optical apparatus, and more specifically relates to an imaging lens, suitable for a factory automation (FA) camera, a digital camera, a surveillance camera, a cinema camera, a projection-type display device and the like, which is capable of adjusting a field curvature, and an optical apparatus including this imaging lens.

2. Description of the Related Art

In order to reduce aberration fluctuation due to the fluctuation of object distance in the aforementioned cameras, and to reduce aberration fluctuation due to the fluctuation of projection distance in the projection-type display device, various imaging lenses of a rear focus type and an inner focus type are proposed. For example, JP2016-024344A discloses a zoom lens of an inner focus type. In the zoom lens of JP2016-024344A, an afocal system that adjusts a field curvature is provided within a relay lens located closer to an image side than a stop.

SUMMARY OF THE INVENTION

In a case where the lens system of a rear focus type or an inner focus type is attached to a camera having a significant error in a flange back, there is a problem in that a field curvature different from a design value occurs. In addition, in a case where an imaging device that captures an image formed by an imaging lens has a curvature, there is a problem in that defocus occurs in the peripheral portion of the imaging device. Further, in an FA field and a machine vision (MV) field, there is a desire for simultaneously observing subjects located at different distances, but there is a problem in that a general imaging lens of the related art is in focus only within one plane perpendicular to its optical axis. An imaging lens capable of adjusting a field curvature is required in order to cope with these problems.

The zoom lens disclosed in JP2016-024344A has a configuration capable of adjusting a field curvature, but has a basic configuration in which an afocal system for the adjustment of the field curvature is provided closer to an image side than a stop. In order to maintain focusing of the central portion of an imaging region during the adjustment of the field curvature while having such a basic configuration, a group located closer to an object side than the stop is also required to form an afocal system. Given such a situation, restrictions are put on a lens configuration, and thus there is a disadvantage that the entire lens system length increases.

In an FA camera, a surveillance camera, and a stationary projection-type display device, since the installation spaces thereof are often limited, a lens system capable of achieving a reduction in size is required. In addition, even in a digital camera, a cinema camera, and a portable projection-type display device, a reduction in the size of a lens system is required in terms of portability.

The present invention has been contrived in view of such circumstances, and an object thereof is to provide an imaging lens, having satisfactory optical performance, which is capable of adjusting a field curvature while suppressing defocusing of the central portion of an imaging region and achieving a reduction in size, and an optical apparatus including this imaging lens.

According to the present invention, there is provided an imaging lens comprising, in order from a side closest to an object: a first lens group which is fixed to an image plane during focusing; a second lens group having a positive refractive power as a whole which moves from an image side to the object side during focusing from a long-distance object to a short-distance object, wherein a field curvature is adjusted by moving the entire first lens group or a sub-lens group within the first lens group including a lens closest to the object side, as an adjustment group, in a direction of an optical axis, a stop which is fixed to the image plane during the adjustment of the field curvature is disposed closer to the image side than the adjustment group, and the following Conditional Expressions (1) and (2) are satisfied, $$-0.05 < f/fA < 0.05 \quad (1)$$

$$0.1 < h1/h2 < 0.9 \quad (2)$$

where f is a focal length of the whole system in a state of being focused on an infinite object, fA is a focal length of the adjustment group, h1 is a height of a paraxial on-axis light ray on a lens surface closest to the object side of the adjustment group, and h2 is a height of a paraxial on-axis light ray on a lens surface closest to the image side of the adjustment group.

In the imaging lens of the present invention, it is preferable that the following Conditional Expression (1-1) and/or (2-1) is satisfied.

$$-0.03 < f/fA < 0.03 \quad (1-1)$$

$$0.3 < h1/h2 < 0.75 \quad (2-1)$$

In the imaging lens of the present invention, it is preferable that the adjustment group consists of a front group having a negative refractive power as a whole and a rear group having a positive refractive power as a whole, in order from the object side, the front group and the rear group are separated from each other by an air spacing maximizing an absolute value of negative refractive power of the front group, and that the following Conditional Expression (3) is satisfied with respect to the whole lens constituting the front group, and it is more preferable that the following Conditional Expression (3-1) is satisfied.

$$0 < \frac{1}{Y\max} \sum_{i=1}^{k} \frac{di}{vi} < 0.1 \quad (3)$$

$$0 < \frac{1}{Y\max} \sum_{i=1}^{k} \frac{di}{vi} < 0.04 \quad (3-1)$$

where Ymax is a maximum image height, k is the total number of lenses included in the front group, di is a central thickness of an i-th lens from the object side of the front group, and vi is an Abbe number based on a d line of an i-th lens from the object side of the front group.

In the imaging lens of the present invention, it is preferable that the adjustment group consists of a front group having a negative refractive power as a whole and a rear group having a positive refractive power as a whole, in order from the object side, the front group and the rear group are separated from each other by an air spacing having a maximum absolute value of negative refractive power of the front group, and that the following Conditional Expression (4) is satisfied, and it is more preferable that the following Conditional Expression (4-1) is satisfied.

$$-2 < Ymax/fAf < 0 \quad (4)$$

$$-1.2 < Ymax/fAf < -0.2 \quad (4-1)$$

where Ymax is a maximum image height, and
fAf is a focal length of the front group.

In the imaging lens of the present invention, it is preferable that the number of lenses included in the adjustment group is equal to or less than five.

In the imaging lens of the present invention, it is preferable that the adjustment group consists of a front group having a negative refractive power as a whole and a rear group having a positive refractive power as a whole, in order from the object side, the front group and the rear group are separated from each other by an air spacing having a maximum absolute value of negative refractive power of the front group, and that the following Conditional Expression (5) is satisfied, and it is more preferable that the following Conditional Expression (5-1) is satisfied.

$$0.01 < dAfr/dA < 0.7 \quad (5)$$

$$0.05 < dAfr/dA < 0.5 \quad (5-1)$$

where dAfr is a distance on the optical axis between the front group and the rear group, and
dA is a distance on the optical axis from the lens surface of the adjustment group closest to the object side to the lens surface of the adjustment group closest to the image side.

In the imaging lens of the present invention, it is preferable that the lens closest to the object side is a negative lens.

In the imaging lens of the present invention, it is preferable that the adjustment group consists of a front group having a negative refractive power as a whole and a rear group having a positive refractive power as a whole, in order from the object side, the front group and the rear group are separated from each other by an air spacing having a maximum absolute value of negative refractive power of the front group, and that the front group includes two or more negative lenses.

According to the present invention, there is provided an optical apparatus comprising the imaging lens of the present invention.

Meanwhile, the wording "include~in order from the object side" is assumed to refer to entirely including components exemplified in continuous and discontinuous manners in order. The terms "~lens group", "adjustment group", "front group", and "rear group" are not necessarily constituted by a plurality of lenses, but may be constituted by only one lens. In addition, in a case where a certain lens group is constituted by a plurality of lenses, the term "sub-lens group" within a certain lens group refers to any one lens or a plurality of lenses adjacent to each other, among the plurality of lenses.

Meanwhile, the number of lenses described above is the number of lenses serving as components. For example, the number of lenses in a cemented lens having a plurality of single lenses different from each other in material cemented to each other is indicated by the number of single lenses constituting this cemented lens. However, a compound aspherical lens (lens in which a spherical lens and an aspherical film formed on the spherical lens are formed integrally with each other to function as one aspherical lens as a whole) is not regarded as a cemented lens, and is assumed to be handled as one lens.

Meanwhile, the term "consist of~" is intended to be substantial, and a lens having substantially no power, optical elements, other than a lens, such as a stop, a filter, or cover glass, a lens flange, a lens barrel, a mechanism portion such as a vibration correction mechanism, and the like may be included in addition to the things enumerated as components.

Meanwhile, the sign of the refractive power of the group and the sign of the refractive power of the lens are assumed to be those in a paraxial region in a case where an aspherical surface is included. All the conditional expressions are based on the d line (wavelength of 587.56 nm) in a state of being focused on an infinite object. In addition, Ymax in the conditional expression is assumed to have a positive value.

According to the present invention, a lens system including, in order from an object side, a first lens group fixed during focusing and a positive second lens group moving to the object side during focusing from a long-distance object to a short-distance object is configured such that an adjustment group for adjusting a field curvature is disposed on a side closest to the object in the whole system, a stop which is fixed during the adjustment of the field curvature is disposed closer to an image side than this adjustment group, and predetermined conditional expressions are satisfied. Therefore, it is possible to provide an imaging lens, having satisfactory optical performance, which is capable of adjusting a field curvature while suppressing defocusing of the central portion of an imaging region and achieving a reduction in size, and an optical apparatus including this imaging lens.

DESCRIPTION OF THE PREFERRED EMBODIMENTS

Figure 1:
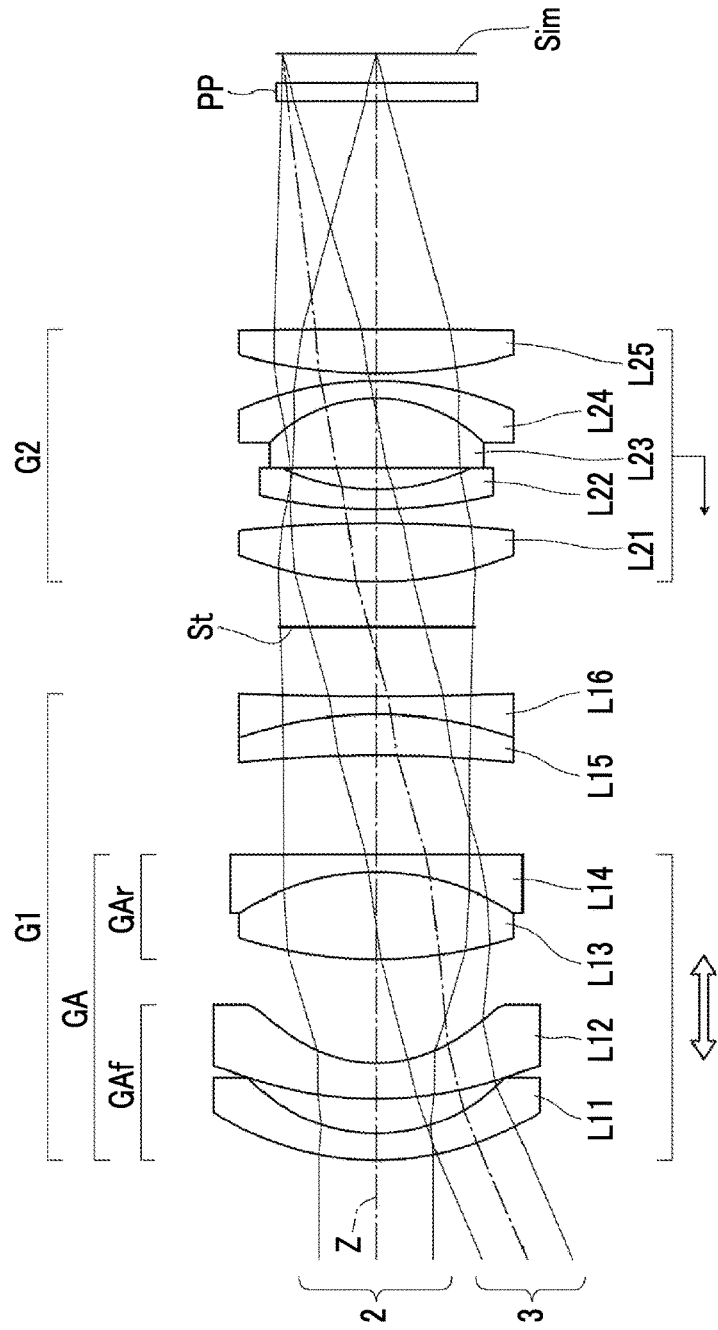
FIG. 1 is a cross-sectional view illustrating a configuration and an optical path of an imaging lens of Example 1 of the present invention.

Hereinafter, an embodiment of the present invention will be described in detail with reference to the accompanying drawings. FIG. 1 is a cross-sectional view illustrating a configuration and an optical path of an imaging lens according to an embodiment of the present invention. A configuration example shown in FIG. 1 corresponds to an imaging lens of Example 1 described later. In FIG. 1, a state of being focused on an infinite object is shown, the left side is an object side, the right side is an image side, and an optical path is shown with respect to an on-axis light flux 2 and an off-axis light flux 3 having a maximum angle of view.

This imaging lens includes a first lens group G1 which is fixed to an image plane Sim during focusing and a second lens group G2 having a positive refractive power as a whole which moves from the image side to the object side during focusing from a long-distance object to a short-distance object, in order from a side closest to the object toward the image side along an optical axis Z. The adoption of such a configuration leads to the advantage of suppressing the fluctuation of a field curvature and spherical aberration with respect to the fluctuation of object distance. Meanwhile, the arrow below the second lens group G2 of FIG. 1 shows the movement direction during focusing.

In the example of FIG. 1, the first lens group G1 consists of six lenses of lenses L11 to L16 in order from the object side, and the second lens group G2 consists of five lenses of lenses L21 to L25 in order from the object side. In addition, in the example of FIG. 1, an aperture stop St is disposed between the first lens group G1 and the second lens group G2. The aperture stop St shown in FIG. 1 does not necessarily show its size or shape, and shows its position on the optical axis Z.

Meanwhile, in the example of FIG. 1, a parallel plate-like optical member PP is disposed between a lens system and the image plane Sim. The optical member PP is assumed to be various types of filters, cover glass and/or the like. In the present invention, the optical member PP may be disposed at a position different from that in the example of FIG. 1, and a configuration can also be used in which the optical member PP is omitted.

The imaging lens of the present invention includes an adjustment group GA moving in the direction of the optical axis in order to adjust a field curvature, as its feature. The adjustment group GA may be the entirety of the first lens group G1, and may be a sub-lens group within the first lens group G1 including a lens closest to the object side. In the example of FIG. 1, a sub-lens group consisting of four lenses of lenses L11 to L14 is the adjustment group GA, and the field curvature is adjusted by moving the adjustment group GA. The double-headed arrow below the lenses L11 to L14 of FIG. 1 means that these lenses move during the adjustment of the field curvature.

The aperture stop St is fixed to the image plane Sim during the adjustment of the field curvature, and the aperture stop St is configured to be disposed closer to the image side than the adjustment group GA. Thereby, since the height of an off-axis principal light ray incident on the adjustment group GA can be changed by changing a distance between the aperture stop St and the adjustment group GA, the field curvature can be made variable.

The adjustment group GA is configured to satisfy the following Conditional Expressions (1) and (2).

$$-0.05 < f/fA < 0.05 \quad (1)$$

$$0.1 < h1/h2 < 0.9 \quad (2)$$

Here, f is a focal length of the whole system in a state of being focused on an infinite object, fA is a focal length of the adjustment group, h1 is a height of a paraxial on-axis light ray on a lens surface of the adjustment group closest to the object side, and h2 is a height of a paraxial on-axis light ray on a lens surface of the adjustment group closest to the image side.

Meanwhile, h1 and h2 are based on a definition in paraxial light ray tracing according to Expressions (2.10) to (2.12), pp.19 of "Optical Technology Series 1 Lens Design Method" (authored by Yoshiya Matsui, Kyoritsu Shuppan Co., Ltd.).

The fluctuation of a back focus when the adjustment group GA is moved in the direction of the optical axis can be suppressed by satisfying Conditional Expression (1), and it is not necessary to adjust a focus again after the field curvature is adjusted. In addition, the adjustment group GA is set to the entirety of the first lens group G1, or a sub-lens group within the first lens group G1 including a lens closest to the object side, and the aperture stop St is fixed during the correction of the field curvature, so that a positional relationship between the aperture stop St and the adjustment group GA is set as stated above, and Conditional Expression (1) is satisfied. Thereby, it is possible to suppress defocusing of the central portion of an imaging region while achieving a reduction in size, and to change the focus of the peripheral portion of the imaging region. It is more preferable to satisfy the following Conditional Expression (1-1) in order to enhance the effect of Conditional Expression (1).

$$-0.03 < f/fA < 0.03 \quad (1\text{-}1)$$

The ratio value is not set to be equal to or less than the lower limit of Conditional Expression (2), and thus it is possible to suppress the height of an on-axis marginal light ray incident on the adjustment group GA and a lens located closer to the image side than the adjustment group GA, which leads to the advantage of a reduction in size and the satisfactory correction of spherical aberration. The ratio value is not set to be equal to or less than the upper limit of Conditional Expression (2), and thus it is possible to prevent the angle of incidence of the off-axis principal light ray on the adjustment group GA and the lens located closer to the image side than the adjustment group GA from becoming excessively steep, which leads to the facilitation of an increase in angle. In addition, the ratio value is not set to be equal to or less than the upper limit of Conditional Expression (2), and thus it is possible to prevent the amount of change in the field curvature with respect to the amount of movement of the adjustment group GA from becoming excessively small, and to prevent the movement space of the adjustment group GA for obtaining a desired change in the field curvature from becoming excessively large. It is more preferable to satisfy the following Conditional Expression (2-1) in order to enhance the effect of Conditional Expression (2).

$$0.3 < h1/h2 < 0.75 \quad (2\text{-}1)$$

In addition, it is preferable that the number of lenses included in the adjustment group GA is equal to or less than five. Such a configuration leads to the advantage of a reduction in the entire lens system length in the direction of the optical axis. In addition, it is preferable that the lens of the whole system closest to the object side is a negative lens. Such a configuration leads to the advantage of a reduction in size in a radial direction.

The adjustment group GA consists of a front group GAf having a negative refractive power as a whole and a rear group GAr having a positive refractive power as a whole, in order from the object side, and it is preferable to form an aspect in which the front group GAf and the rear group GAr are separated from each other by an air spacing having a maximum absolute value of the negative refractive power of the front group GAf. For example, in the example of FIG. 1, the number of air spacings within the adjustment group GA is two of an air spacing between the lens L11 and the lens L12 and an air spacing between the lens L12 and the lens L13. However, since a lens group consisting of the lens L11 and the lens L12 is larger in the absolute value of negative refractive power than a lens group consisting of only the lens L11, the adjustment group is divided into the front group GAf and the rear group GAr by the air spacing between the lens L12 and the lens L13.

The adjustment group GA has the above preferred aspect adopted therein, and thus it is easy to satisfy Conditional Expression (2). In addition, the adjustment group GA is configured to consist of the negative front group GAf and the positive rear group GAr in order from the object side, and thus an afocal system has a tendency to be formed, which leads to the advantage of the satisfactory adjustment of the field curvature.

In a case where the adjustment group GA has the above preferred aspect adopted therein, it is preferable to satisfy the following Conditional Expression (3) with respect to the whole lens constituting the front group GAf.

$$0 < \frac{1}{Y\max} \sum_{i=1}^{k} \frac{di}{vi} < 0.1 \qquad (3)$$

Here, Ymax is a maximum image height,
k is the total number of lenses included in the front group,
di is a central thickness of an i-th lens from the object side of the front group, and
vi is an Abbe number based on a d line of an i-th lens from the object side of the front group.

Since the height of the off-axis principal light ray in the front group GAf is higher than that in the rear group GAr, the fluctuation of lateral chromatic aberration occurring in the front group GAf when the field curvature is adjusted by moving the adjustment group GA becomes larger than in the rear group GAr. Consequently, the ratio value is not set to be equal to or less than the upper limit of Conditional Expression (3), and thus it is possible to suppress the fluctuation of lateral chromatic aberration when the field curvature is adjusted. Meanwhile, the lower limit of Conditional Expression (3) is set to 0 because Ymax, di and vi are positive values.

It is more preferable to satisfy the following Conditional Expression (3-1) in order to enhance the effect of Conditional Expression (3).

$$0 < \frac{1}{Y\max} \sum_{i=1}^{k} \frac{di}{vi} < 0.04 \qquad (3\text{-}1)$$

In addition, in a case where the adjustment group GA has the above preferred aspect adopted therein, it is preferable to satisfy the following Conditional Expression (4).

$$-2 < Y\max / fAf < 0 \qquad (4)$$

Here, Ymax is a maximum image height, and
fAf is a focal length of the front group.

In a case where the negative refractive power of the front group GAf increases while maintaining Conditional Expression (2), the height of the off-axis principal light ray in the front group GAf is higher than that in the rear group GAr, and thus the fluctuation of distortion occurring in the front group GAf when the field curvature is adjusted by moving the adjustment group GA becomes larger than in rear group GAr. Consequently, the ratio value is not set to be equal to or less than the lower limit of Conditional Expression (4), and thus it is possible to prevent the negative refractive power of the front group GAf from increasing excessively, and to suppress the fluctuation of distortion when the field curvature is adjusted. In addition, the ratio value is not set to be equal to or less than the upper limit of Conditional Expression (4), and thus it is possible to prevent the negative refractive power of the front group GAf from decreasing excessively, and to suppress an increase in the entire length of the adjustment group GA while satisfying the upper limit of Conditional Expression (2). It is more preferable to satisfy the following Conditional Expression (4-1) in order to enhance the effect of Conditional Expression (4).

$$-1.2 < Y\max / fAf < -0.2 \qquad (4\text{-}1)$$

In addition, in a case where the adjustment group GA has the above preferred aspect adopted therein, it is preferable to satisfy the following Conditional Expression (5).

$$0.01 < dAfr / dA < 0.7 \qquad (5)$$

Here, dAfr is a distance on the optical axis between the front group and the rear group, and
dA is a distance on the optical axis from the lens surface of the adjustment group closest to the object side to the lens surface of the adjustment group closest to the image side.

It is necessary to increase the absolute value of each refractive power of the front group GAf and the rear group GAr in order to satisfy the lower limit of Conditional Expression (2), but this makes it difficult to perform the correction of aberration. Consequently, the ratio value is not set to be equal to or less than the lower limit of Conditional Expression (5), and thus it is easy to perform the correction of aberration while satisfying the lower limit of Conditional Expression (2). The ratio value is not set to be equal to or less than the upper limit of Conditional Expression (5), which leads to the advantage of a reduction in the entire lens system length. It is preferable to satisfy the following Conditional Expression (5-1) in order to enhance the effect of Conditional Expression (5).

$$0.05 < dAfr / dA < 0.5 \qquad (5\text{-}1)$$

Specifically, the front group GAf and the rear group GAr can be configured as follows. The front group GAf can be configured to consist of a negative meniscus lens with its concave surface toward the image side and a negative lens with its concave surface toward the image side, in order from the object side, and the rear group GAr can be configured to consist of a cemented lens having one positive lens and one negative lens cemented together. In this case, the surface of the rear group GAr closest to the object side may be configured to be a convex surface. Alternatively, the front group GAf may be configured to consist of a negative meniscus lens with its concave surface toward the image side, a negative lens with its concave surface toward the image side, a positive lens, and a negative meniscus lens with its concave surface toward the image side, in order from the object side, and the rear group GAr may be configured to consist of one biconvex lens.

In addition, the number of lenses included in the first lens group G1 can be set to be, for example, equal to or greater than four and equal to or less than six. The number of lenses included in the second lens group G2 can be set to be, for example, four or five. The second lens group G2 may be constituted by four lenses in which a positive lens, a negative lens, a positive lens, and a negative lens are arrayed in order from the object side, or, the second lens group G2 may be constituted by five lenses in which a positive lens, a negative lens, a positive lens, a negative lens, and a positive lens are arrayed in order from the object side.

The above-mentioned preferred configurations and available configurations can be arbitrarily combined, and it is preferable that the configurations are appropriately selectively adopted in accordance with requested specification. According to the present embodiment, it is possible to realize an imaging lens having satisfactory optical performance which is capable of achieving a reduction in size and adjusting a field curvature while suppressing the defocusing of the central portion of an imaging region. Meanwhile, in a case where the distance on the optical axis from the lens surface of the lens system closest to the object side to the image plane is set to TL, and the maximum image height is set to Ymax, the term "reduction in size" as used herein means a configuration in which TL/Ymax is less than 30.

Even in a case where, for example, the flange back of a camera deviates from a standard value, or an imaging device disposed at the image plane position of the imaging lens has a curvature, by using a configuration capable of adjusting a field curvature, it is possible to obtain a satisfactory image.

In addition, in a case where objects are disposed at different depthwise positions which are two points within the imaging region by using a configuration capable of adjusting a field curvature, it is possible to bring the objects into focus at both these points. Further, in this case, it is possible to bring different depthwise objects into focus at three or more points through the contrivance of the disposition of objects. A subject is disposed so as to cut out a portion of the acquired image which is asymmetric with respect to the optical axis, and thus an average image plane can be completely fit to a combination of three subject distances.

Meanwhile, it is assumed that the imaging lens of the present invention has a field curvature adjusted by a user after shipment, but can also be used for correcting a field curvature occurring due to a manufacturing error of a lens.

Next, numerical value examples of the imaging lens of the present invention will be described.

EXAMPLE 1

The lens configuration of an imaging lens of Example 1 is shown in FIG. 1, and the configuration thereof and a method of illustration thereof are as described. Therefore, the repeated description thereof will be partially omitted herein. The imaging lens of Example 1 consists of a first lens group G1, an aperture stop St, and a second lens group G2, in order from the object side. This imaging lens has a rear focus type adopted therein, and is configured such that, during focusing from an infinite object to a short-distance object, the first lens group G1 is fixed to an image plane Sim, and that the second lens group G2 and the aperture stop St integrally move from the image side to the object side.

The first lens group G1 consists of six lenses of lenses L11 to L16 in order from the object side. An adjustment group GA that adjusts a field curvature consists of some lenses of the first lens group G1. The adjustment group GA consists of a front group GAf and a rear group GAr in order from the object side. The front group GAf consists of the lenses L11 and L12, and the rear group GAr consists of the lens L13 and L14. The second lens group G2 consists of five lenses of lenses L21 to L25 in order from the object side. During the adjustment of the field curvature, only the adjustment group GA moves in the direction of the optical axis.

Table 1 shows basic lens data of the imaging lens of Example 1, Table 2 shows specifications and variable surface spacings, and Table3 shows aspherical coefficients. The column of Si in Table 1 indicates an i-th (i=1, 2, 3, . . . ) surface number in a case where surface numbers are assigned to the surfaces of components so as to sequentially increase toward the image side with the object-side surface of a component closest to the object side set to a first surface, the column of Ri indicates a radius of curvature of the i-th surface, and the column of Di indicates a surface spacing on the optical axis Z between the i-th surface and an (i+1)-th surface. Meanwhile, the symbol i in the table of the basic lens data is used independently of Conditional Expressions (3) and (3-1). The column of Ndj in Table 1 indicates a refractive index of a j-th (j=1, 2, 3, . . . ) component relating to the d line (wavelength of 587.56 nm), where j sequentially increases toward the image side with the component closest to the object side set to a first component, and the column of vdj indicates an Abbe number based on the d line of the j-th component.

Here, the sign of the radius of curvature is set to be positive with respect to a surface shape with its convex surface toward the object side, and is set to be negative with respect to a surface shape with its convex surface toward the image side. Table 1 also shows the aperture stop St and the optical member PP together. In Table 1, a surface number and a term of (St) are written in the place of the surface number of a surface equivalent to the aperture stop St. The value in the lowermost place of Di is a spacing between the surface closest to the image side in the table and the image plane Sim. In Table 1, regarding the variable surface spacing changing during focusing, the symbol of DD[] is used, and the surface number of this spacing on the object side is attached to the inside of [] and is written in the column of Di.

Table 2 shows values of a focal length f of the whole system, an F-Number FNo., the maximum total angle of view 2ω, a maximum image height Ymax, and variable surface spacings during focusing, on the basis of the d line. The unit of 2ω is a degree, and the unit of Ymax is mm. In Table 2, each value in a state of being focused on an infinite object is indicated in the place denoted by "infinity", and each value in a state of being focused on an object having an object distance of 0.1 m is indicated in the place denoted by "0.1 m".

In Table 1, mark * is attached to the surface number of an aspherical surface, and the numerical values of a paraxial radius of curvature are written in the column of the radius of curvature of the aspherical surface. Table 3 shows an aspherical coefficient of each aspherical surface of Example 1. "E±n" (n is an integer) of the numerical value of the aspherical coefficient in Table 3 means "×10±n". The aspherical coefficient is a value of each of the coefficients KA and Am (m=3, 4, 5, . . . 20) in an aspherical expression represented by the following expression.

$$Zd = \frac{C \times h^2}{1 + \sqrt{1 - KA \times C^2 \times h^2}} + \sum_m Am \times h^m$$

Here, Zd is an aspherical depth (length of a vertical line drawn from a point on an aspherical surface having a height h down to a plane perpendicular to the optical axis with which the vertex of the aspherical surface is in contact), h is a height (distance from the optical axis to a lens surface), C is a paraxial curvature, and KA and Am are aspherical coefficients.

For data of each table, a degree is used as the unit of an angle, and mm is used as the unit of a length, but it is also possible to use other appropriate units since the optical system can be used even in a case where the system is magnified or reduced in proportion. In addition, each of the following tables describes numerical values rounded off to predetermined decimal places.

TABLE 1

Example 1

| Si | Ri | Di | Ndj | νdj |
|---|---|---|---|---|
| 1 | 17.79124 | 1.533 | 1.85026 | 32.28 |
| 2 | 10.32952 | 2.000 | | |
| *3 | 24.16424 | 2.000 | 1.56867 | 58.27 |
| *4 | 8.20996 | 5.897 | | |
| 5 | 26.81718 | 4.944 | 1.83481 | 42.72 |
| 6 | −14.93757 | 1.010 | 1.51742 | 52.42 |
| 7 | −2208.94041 | 5.648 | | |
| 8 | −81.14054 | 2.324 | 1.71300 | 53.85 |
| 9 | −24.91906 | 1.010 | 1.58144 | 40.75 |
| 10 | 205.25880 | DD[10] | | |
| 11(St) | ∞ | 2.576 | | |
| 12 | 21.82624 | 3.338 | 1.71300 | 53.85 |
| 13 | −76.59268 | 0.804 | | |
| 14 | 30.06631 | 1.132 | 1.64769 | 33.80 |
| 15 | 13.03395 | 1.217 | | |
| 16 | ∞ | 3.940 | 1.59522 | 67.72 |
| 17 | −8.98500 | 1.000 | 1.80518 | 25.43 |
| 18 | −20.01899 | 0.431 | | |
| 19 | 31.79529 | 2.475 | 1.83481 | 42.72 |
| 20 | −612.26782 | DD[20] | | |
| 21 | ∞ | 1.000 | 1.51633 | 64.14 |
| 22 | ∞ | 1.649 | | |

TABLE 2

Example 1

| | Infinity | 0.1 m |
|---|---|---|
| f | 12.307 | 12.399 |
| FNo. | 1.85 | 1.95 |
| 2ω | 49.8 | 48.0 |
| Ymax | 5.5 | 5.5 |
| DD[10] | 3.932 | 2.508 |
| DD[20] | 13.000 | 14.424 |

TABLE 3

Example 1

| Surface Number | 3 | 4 |
|---|---|---|
| KA | 1.0000000E+00 | 1.0000000E+00 |
| A3 | 3.7936801E−20 | −8.7378664E−19 |
| A4 | 5.3979799E−05 | −4.4609204E−04 |
| A5 | 1.2332743E−05 | 5.3901902E−04 |
| A6 | −3.1352893E−06 | −2.8685627E−04 |
| A7 | 1.0790330E−07 | 4.6577300E−05 |
| A8 | −1.0822135E−07 | 1.4290990E−05 |
| A9 | −4.0678223E−08 | −6.5877097E−06 |
| A10 | 1.7356681E−08 | 2.1170807E−07 |
| A11 | 1.7051573E−09 | 2.7345487E−07 |
| A12 | −7.4887920E−10 | −3.1055839E−08 |
| A13 | −3.4454668E−11 | −5.7850596E−09 |
| A14 | 1.6395034E−11 | 9.7702793E−10 |
| A15 | 3.8013376E−13 | 6.8663416E−11 |
| A16 | −1.9821116E−13 | −1.5462937E−11 |
| A17 | −2.2031011E−15 | −4.4350844E−13 |
| A18 | 1.2601411E−15 | 1.3003699E−13 |
| A19 | 5.2629584E−18 | 1.2384936E−15 |
| A20 | −3.2932877E−18 | −4.7070135E−16 |

Figure 6:
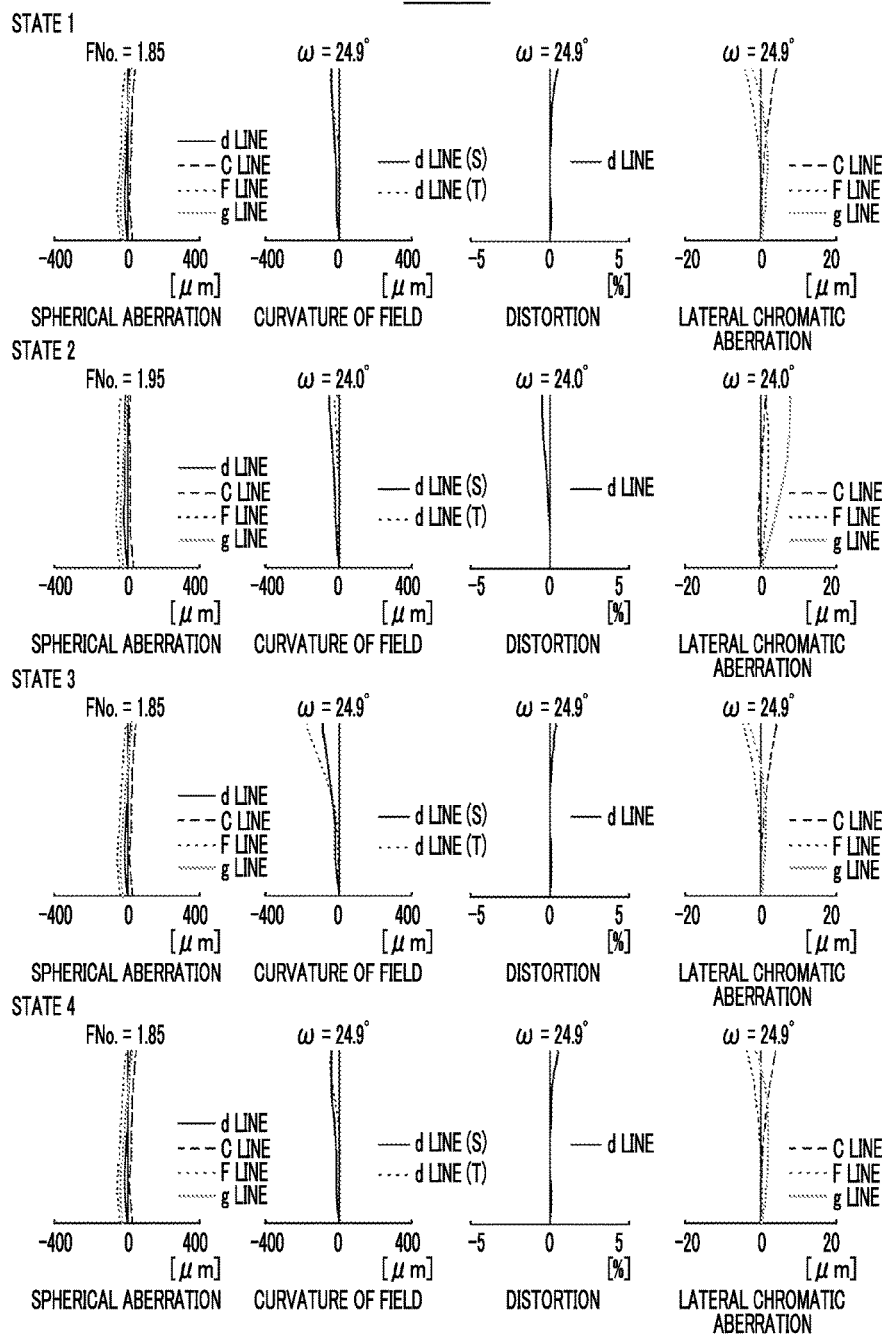
FIG. 6 is a diagram of aberrations of the imaging lens of Example 1 of the present invention.

FIG. 6 shows a diagram of aberrations of the imaging lens of Example 1. The diagram of aberrations of state 1, state 2, state 3, and state 4 described later is shown in the uppermost stage, the second stage from the top, the third stage from the top, and the lowermost stage in FIG. 6. In the respective stages, spherical aberration, the field curvature, distortion (distortion aberration), and lateral chromatic aberration (chromatic aberration of magnification) are shown in order from the left. In the spherical aberration diagram, aberrations relating to a d line (wavelength of 587.56 nm), a C line (wavelength 656.27 nm), an F line (wavelength 486.13 nm), and a g line (wavelength 435.84 nm) are indicated by a black solid line, a long dashed line, a short dashed line, and a gray solid line, respectively. In the field curvature diagram, aberration relating to the d line in a sagittal direction is indicated by a solid line, and aberration relating to the d line in a tangential direction is indicated by a short dashed line. In the distortion diagram, aberration relating to the d line is indicated by a solid line. In the lateral chromatic aberration diagram, aberrations relating to the C line, the F line, and the g line are indicated by a long dashed line, a short dashed line, and a gray solid line, respectively. FNo. in the spherical aberration diagram means an F-Number, and ω in the other aberration diagrams means a half angle of view.

The state 1 is a state of being focused on an infinite object. The state 2 is a state of being focused on an object having an object distance of 0.1 m. The state 3 and the state 4 are assumed to adjust a focus in a case where an error is present in a flange back, and to further adjust a field curvature. The state 3 is a state where only the second lens group G2 is focused on the image plane Sim by moving the lens group in the direction of the optical axis after a state where a distance between the entire lens system and the image plane Sim is shorter by 0.04f than in the state 1. In a case where the field curvature diagrams of the state 1 and the state 3 are compared with each other, it can be understood that the field curvature in the state 3 is larger than the field curvature in the state 1. The state 4 is a state where the field curvature is adjusted by moving the adjustment group GA from the state 3 to the object side by 0.036f. It can be understood that the field curvature in the state 4 is improved until it becomes considerably smaller than the field curvature in the state 3 and becomes almost the same as the field curvature in the state 1.

Symbols, meanings, and description methods of the respective pieces of data which have been set forth in the description of Example 1 are the same as those in the following examples unless otherwise noted, and thus the repeated description thereof will be omitted below.

EXAMPLE 2

Figure 2:
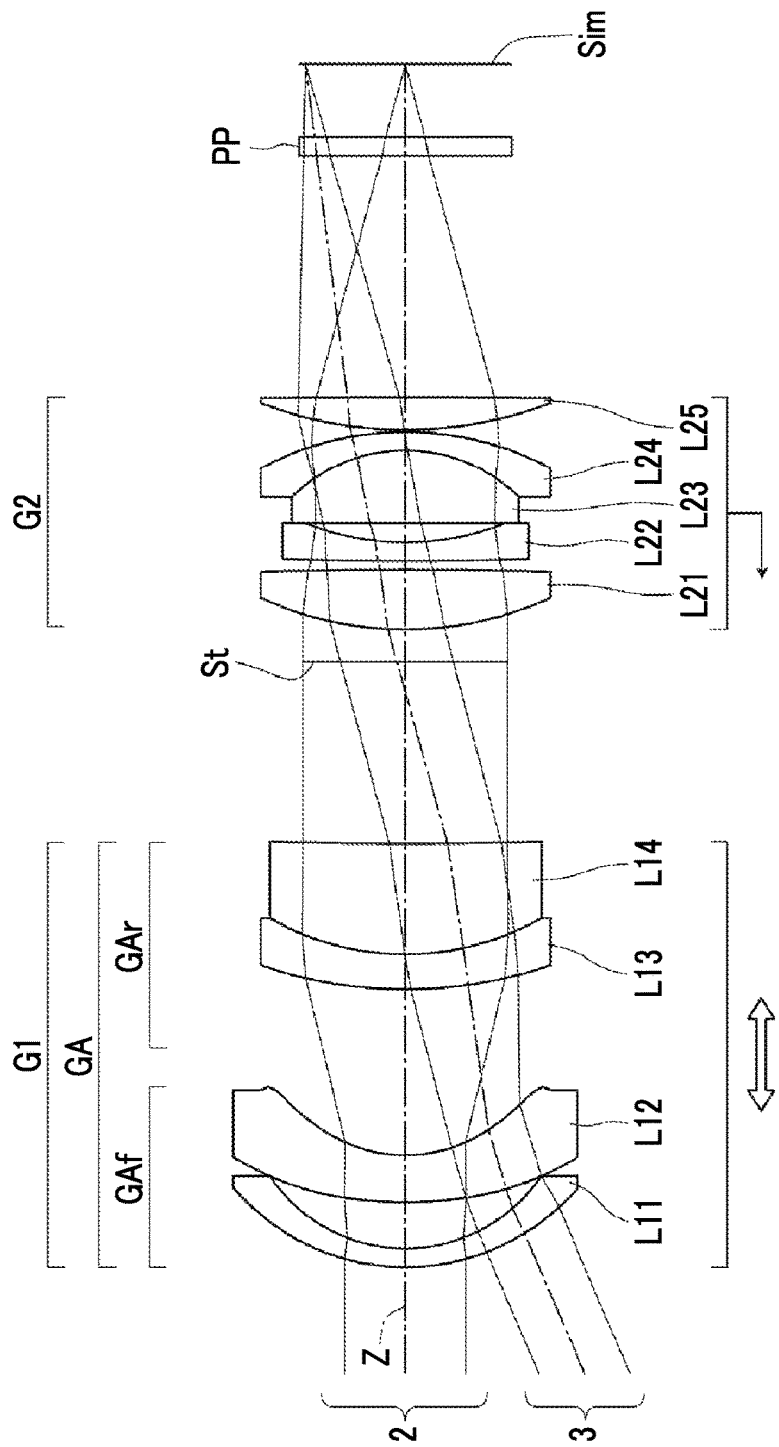
FIG. 2 is a cross-sectional view illustrating a configuration and an optical path of an imaging lens of Example 2 of the present invention.

FIG. 2 shows a cross-sectional view of a lens configuration and an optical path of an imaging lens of Example 2. The imaging lens of Example 2 consists of a first lens group G1, an aperture stop St, and a second lens group G2, in order from the object side. This imaging lens has a rear focus type adopted therein, and is configured such that, during focusing from an infinite object to a short-distance object, the first lens group G1 is fixed to an image plane Sim, and that the second lens group G2 and the aperture stop St move integrally from the image side to the object side.

The first lens group G1 consists of four lenses of lenses L11 to L14 in order from the object side. An adjustment group GA that adjusts a field curvature is the entirety of the first lens group G1. The adjustment group GA consists of a front group GAf and a rear group GAr in order from the object side. The front group GAf consists of the lenses L11 and L12, and the rear group GAr consists of the lenses L13 and L14. The second lens group G2 consists of five lenses of lenses L21 to L25 in order from the object side. During the adjustment of the field curvature, only the adjustment group GA moves in the direction of the optical axis.

Figure 7:
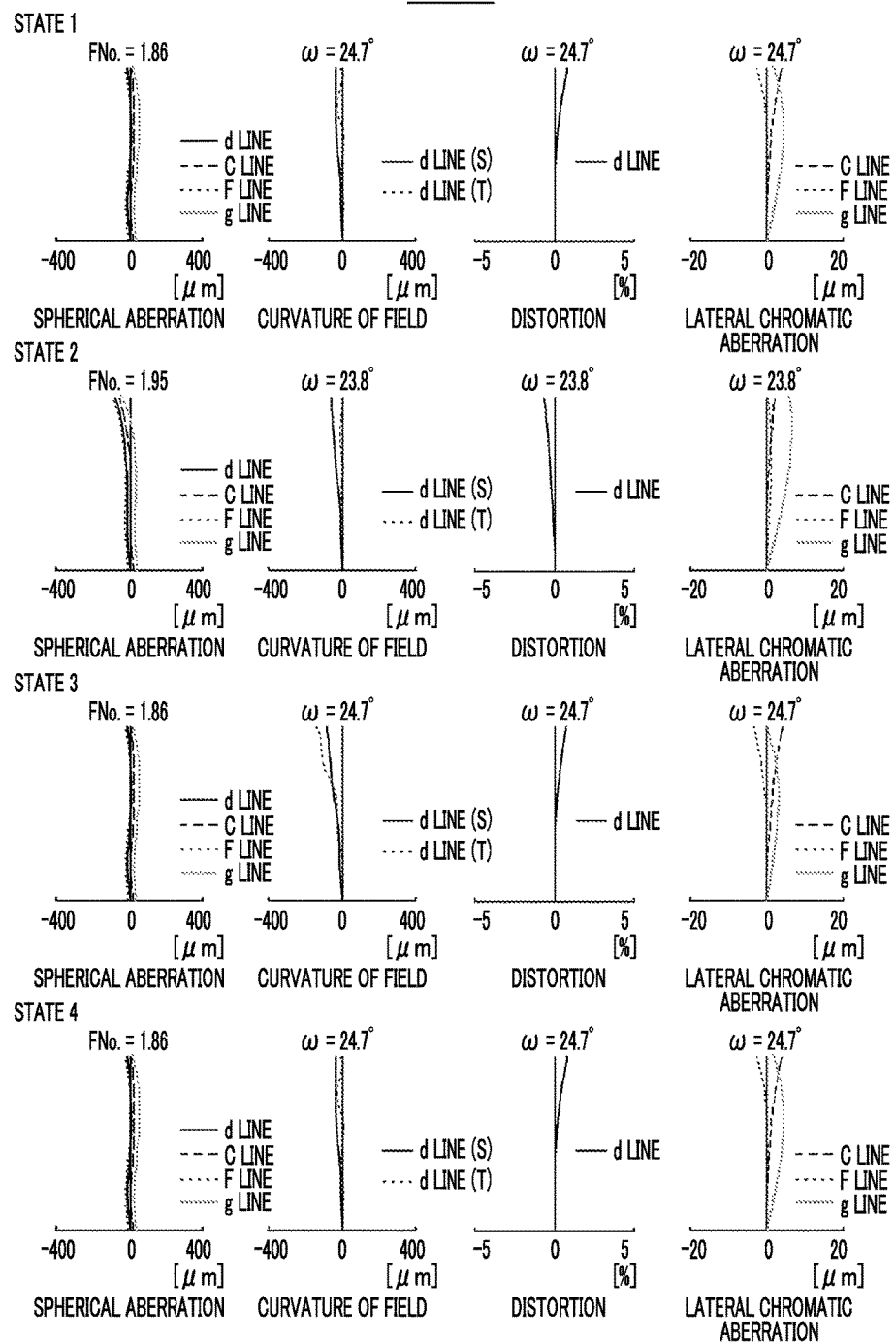
FIG. 7 is a diagram of aberrations of the imaging lens of Example 2 of the present invention.

Table 4 shows basic lens data of the imaging lens of Example 2, Table 5 shows specifications and variable surface spacings, Table 6 shows aspherical coefficients, and FIG. 7 shows a diagram of aberrations. State 1 to state 4 shown in FIG. 7 are the same as those in Example 1 described above, except that the amount of movement of the adjustment group GA during transition from the state 3 to the state 4 is 0.04f.

TABLE 4

Example 2

| Si | Ri | Di | Ndj | νdj |
|---|---|---|---|---|
| 1 | 12.77827 | 1.000 | 1.59551 | 39.23 |
| 2 | 9.17144 | 2.507 | | |
| *3 | 27.29638 | 2.500 | 1.56867 | 58.27 |
| *4 | 8.34102 | 8.947 | | |
| 5 | 25.34528 | 1.884 | 1.51742 | 52.42 |
| 6 | 15.43580 | 5.947 | 1.85150 | 40.78 |
| 7 | 298.60525 | DD[7] | | |
| 8(St) | ∞ | 1.743 | | |
| 9 | 19.69917 | 3.205 | 1.77250 | 49.61 |
| 10 | −296.56160 | 0.478 | | |
| 11 | 225.71758 | 1.000 | 1.84666 | 23.78 |
| 12 | 15.19013 | 1.029 | | |
| 13 | ∞ | 3.939 | 1.61800 | 63.38 |
| 14 | −8.98500 | 1.000 | 1.90366 | 31.31 |
| 15 | −17.24294 | 0.100 | | |
| 16 | 22.82966 | 1.751 | 1.85150 | 40.78 |
| 17 | −765.66939 | DD[17] | | |
| 18 | ∞ | 1.000 | 1.51633 | 64.14 |
| 19 | ∞ | 3.934 | | |

TABLE 5

Example 2

| | Infinity | 0.1 m |
|---|---|---|
| f | 12.413 | 12.427 |
| FNo. | 1.86 | 1.95 |
| 2ω | 49.4 | 47.6 |
| Ymax | 5.5 | 5.5 |
| DD[7] | 9.791 | 8.398 |
| DD[17] | 13.000 | 14.393 |

TABLE 6

Example 2

| Surface Number | 3 | 4 |
|---|---|---|
| KA | 1.0000000E+00 | 1.0000000E+00 |
| A3 | 2.1684043E−19 | 5.5511151E−18 |
| A4 | 3.9301997E−06 | −4.7889738E−04 |
| A5 | 8.7377865E−05 | 6.5524495E−04 |
| A6 | −6.6176241E−06 | −2.9927732E−04 |
| A7 | −5.0943696E−06 | 3.3153527E−05 |
| A8 | 6.9328238E−07 | 1.7817440E−05 |
| A9 | 1.7488806E−07 | −5.6183226E−06 |
| A10 | −3.1214370E−08 | −1.2258912E−07 |
| A11 | −3.7133691E−09 | 2.3116373E−07 |
| A12 | 7.7030962E−10 | −1.4152861E−08 |
| A13 | 4.9485354E−11 | −4.6580520E−09 |
| A14 | −1.1092209E−11 | 4.7372935E−10 |
| A15 | −4.0371898E−13 | 5.0721667E−11 |
| A16 | 9.2373403E−14 | −6.5759931E−12 |
| A17 | 1.8439339E−15 | −2.8688608E−13 |
| A18 | −4.0977508E−16 | 4.3608396E−14 |
| A19 | −3.6104083E−18 | 6.6222751E−16 |
| A20 | 7.4376616E−19 | −1.1337985E−16 |

EXAMPLE 3

Figure 3:
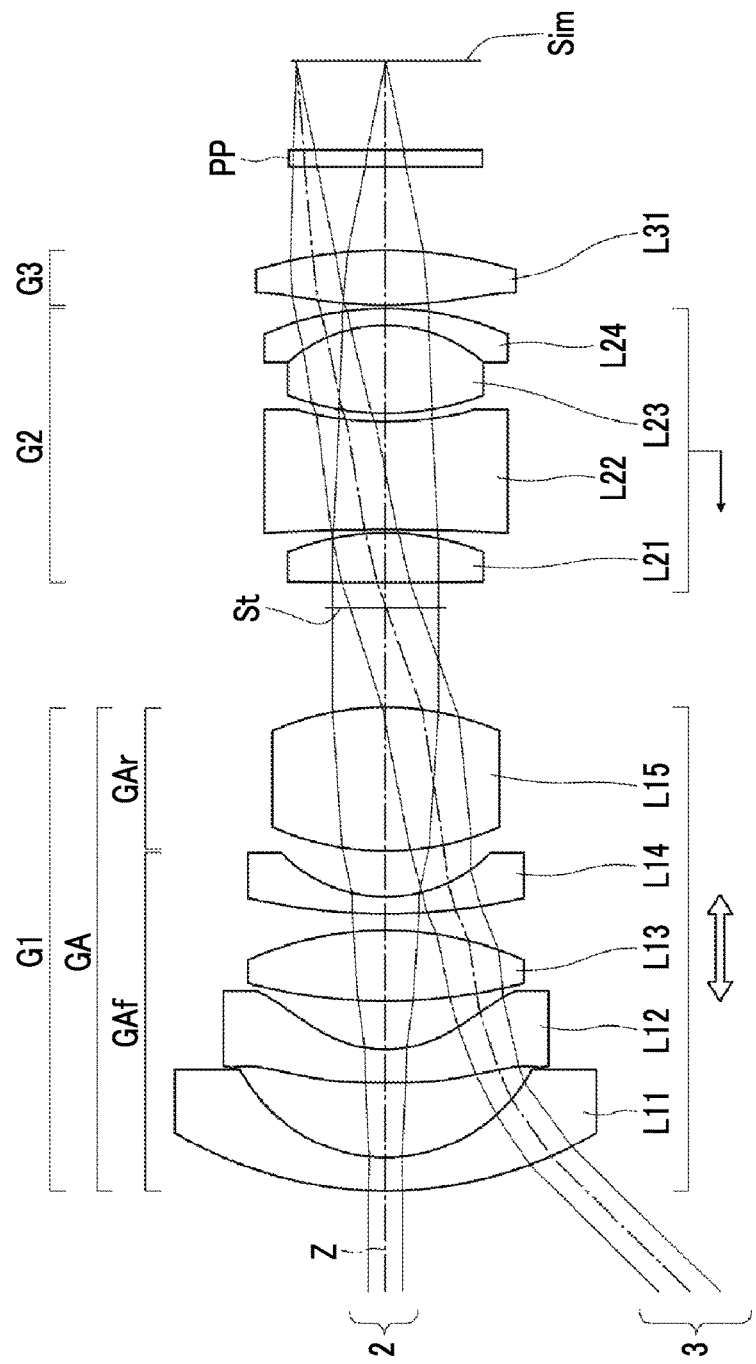
FIG. 3 is a cross-sectional view illustrating a configuration and an optical path of an imaging lens of Example 3 of the present invention.

FIG. 3 shows a cross-sectional view of a lens configuration and an optical path of an imaging lens of Example 3. The imaging lens of Example 3 consists of a first lens group G1, an aperture stop St, a second lens group G2, and a third lens group G3, in order from the object side. This imaging lens has an inner focus type adopted therein, and is configured such that, during focusing from an infinite object to a short-distance object, the first lens group G1 and the third lens group G3 are fixed to an image plane Sim, and that the second lens group G2 and the aperture stop St move integrally from the image side to the object side.

The first lens group G1 consists of five lenses of lenses L11 to L15 in order from the object side. An adjustment group GA that adjusts a field curvature is the entirety of the first lens group G1. The adjustment group GA consists of a front group GAf and a rear group GAr in order from the object side. The front group GAf consists of the lenses L11 to L14, and the rear group GAr consists of the lens L15. The second lens group G2 consists of four lenses of lenses L21 to L24 in order from the object side. The third lens group G3 consists of only a lens L31. During the adjustment of the field curvature, only the adjustment group GA moves in the direction of the optical axis.

Figure 8:
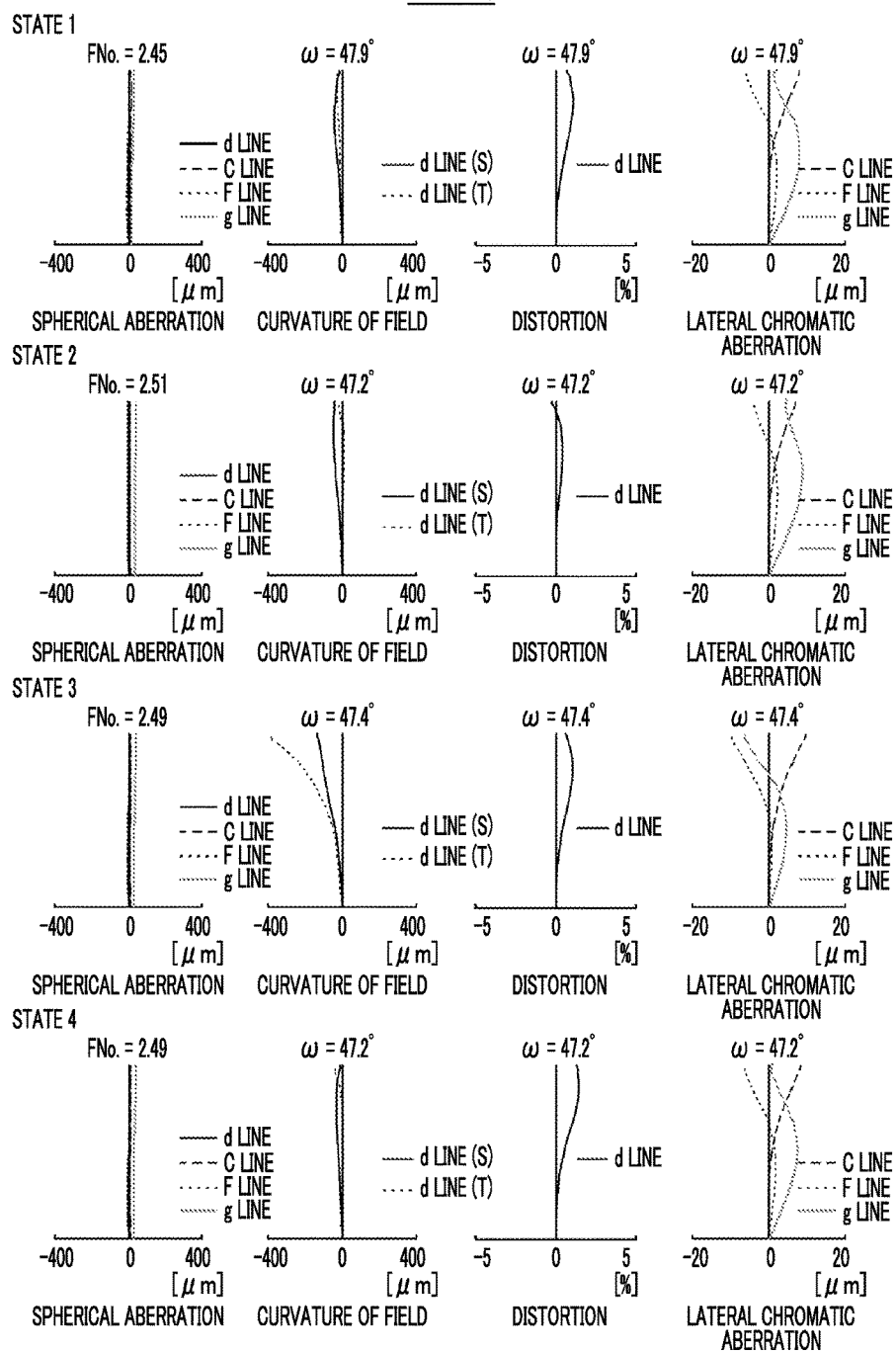
FIG. 8 is a diagram of aberrations of the imaging lens of Example 3 of the present invention.

Table 7 shows basic lens data of the imaging lens of Example 3, Table 8 shows specifications and variable surface spacings, Table 9 shows aspherical coefficients, and FIG. 8 shows a diagram of aberrations. State 1 to state 4 shown in FIG. 8 are the same as those in Example 1 described above, except that the amount of movement of the adjustment group GA during transition from the state 3 to the state 4 is 0.15f.

TABLE 7

| | | Example 3 | | |
|---|---|---|---|---|
| Si | Ri | Di | Ndj | vdj |
| 1 | 25.86482 | 2.008 | 1.85001 | 42.99 |
| 2 | 10.29240 | 4.515 | | |
| *3 | 142.90293 | 2.000 | 1.61881 | 63.86 |
| *4 | 8.66311 | 2.904 | | |
| 5 | 35.02666 | 4.221 | 1.56110 | 43.53 |
| 6 | −21.25122 | 1.006 | | |
| 7 | 39.09856 | 1.000 | 1.85000 | 42.99 |
| 8 | 9.16261 | 2.798 | | |
| 9 | 17.86446 | 8.599 | 1.64086 | 34.23 |
| 10 | −18.20077 | DD[10] | | |
| 11(St) | ∞ | 1.500 | | |
| 12 | 389.87494 | 3.027 | 1.51999 | 64.20 |
| 13 | −16.18535 | 0.200 | | |
| 14 | −127.80455 | 6.463 | 1.81900 | 25.89 |
| 15 | 21.45568 | 0.509 | | |
| 16 | 17.45339 | 5.272 | 1.54023 | 63.48 |
| 17 | −9.22667 | 1.000 | 1.85000 | 22.50 |
| 18 | −19.04160 | DD[18] | | |
| *19 | 26.10366 | 3.330 | 1.58313 | 59.44 |
| *20 | −26.75806 | 5.000 | | |
| 21 | ∞ | 1.000 | 1.51633 | 64.14 |
| 22 | ∞ | 5.344 | | |

TABLE 8

| | Example 3 | |
|---|---|---|
| | Infinity | 0.1 m |
| f | 5.165 | 5.277 |
| FNo. | 2.45 | 2.51 |
| 2ω | 95.8 | 94.4 |
| Ymax | 5.5 | 5.5 |
| DD[10] | 5.976 | 4.896 |
| DD[18] | 0.200 | 1.280 |

TABLE 9

| | Example 3 | | | |
|---|---|---|---|---|
| Surface Number | 3 | 4 | 19 | 20 |
| KA | 1.0000000E+00 | 1.0000000E+00 | 1.0000000E+00 | 1.0000000E+00 |
| A3 | −2.7755576E−18 | 3.0493186E−18 | −8.6736174E−20 | −1.7347235E−19 |
| A4 | 1.4610664E−03 | 1.7005770E−03 | −2.8963501E−05 | 1.0690511E−05 |
| A5 | −2.7723929E−04 | −8.4748836E−04 | −4.3558855E−05 | 2.3982877E−05 |
| A6 | −1.3657170E−05 | 3.3089179E−04 | 8.1274456E−06 | −1.1463123E−05 |
| A7 | 2.7930283E−05 | −5.6010079E−05 | 2.3559830E−06 | 1.3557914E−06 |
| A8 | −7.8794883E−06 | −1.2126538E−05 | −1.0709141E−06 | 3.1515873E−07 |
| A9 | 7.1517130E−08 | 5.5159877E−06 | 2.5194293E−08 | −5.1437222E−08 |
| A10 | 3.2915481E−07 | −2.0579804E−07 | 4.2080429E−08 | −9.0035279E−09 |
| A11 | −3.8846595E−08 | −1.7552362E−07 | −3.9549062E−09 | 6.7431504E−10 |
| A12 | −5.0674570E−09 | 2.1498849E−08 | −8.8069260E−10 | 2.6707026E−10 |
| A13 | 1.1242084E−09 | 2.3614635E−09 | 1.0758949E−10 | 8.0183340E−13 |
| A14 | 1.6837453E−11 | −5.2896838E−10 | 1.1742108E−11 | −5.8471114E−12 |
| A15 | −1.4578646E−11 | −4.1662610E−12 | −1.3849913E−12 | −1.0837299E−13 |
| A16 | 3.9968890E−13 | 5.7256864E−12 | −1.0518411E−13 | 7.7153016E−14 |
| A17 | 9.2032503E−14 | −2.0062331E−13 | 8.8404388E−15 | 1.0119051E−15 |
| A18 | −4.6011408E−15 | −2.3198210E−14 | 5.7680959E−16 | −5.3806179E−16 |
| A19 | −2.2982974E−16 | 1.4072985E−15 | −2.2492003E−17 | −3.0270889E−18 |
| A20 | 1.4772293E−17 | −5.1006908E−18 | −1.4165565E−18 | 1.5165496E−18 |

EXAMPLE 4

Figure 4:
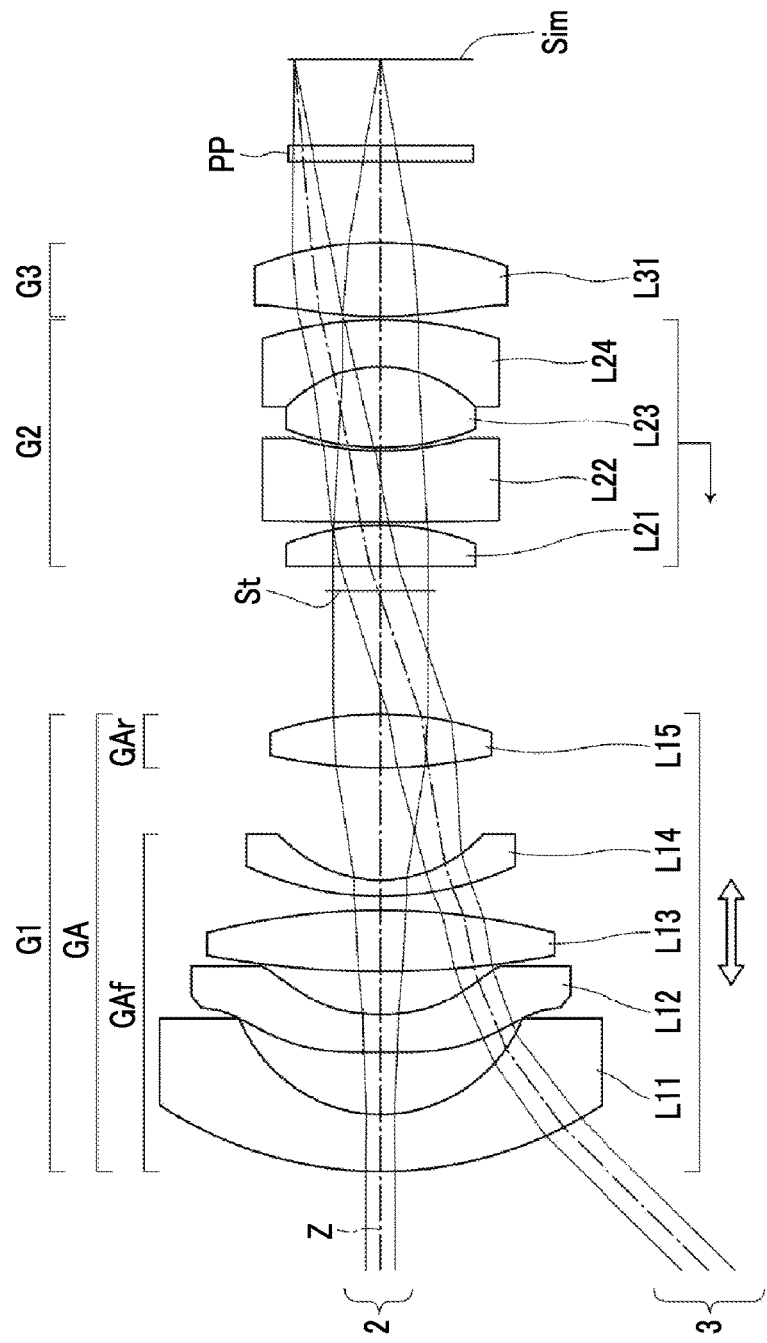
FIG. 4 is a cross-sectional view illustrating a configuration and an optical path of an imaging lens of Example 4 of the present invention.

FIG. 4 shows a cross-sectional view of a lens configuration and an optical path of an imaging lens of Example 4. The imaging lens of Example 4 has an inner focus type adopted therein, and the group configuration thereof and the number of lenses constituting each lens group are the same as those in Example 3.

Figure 9:
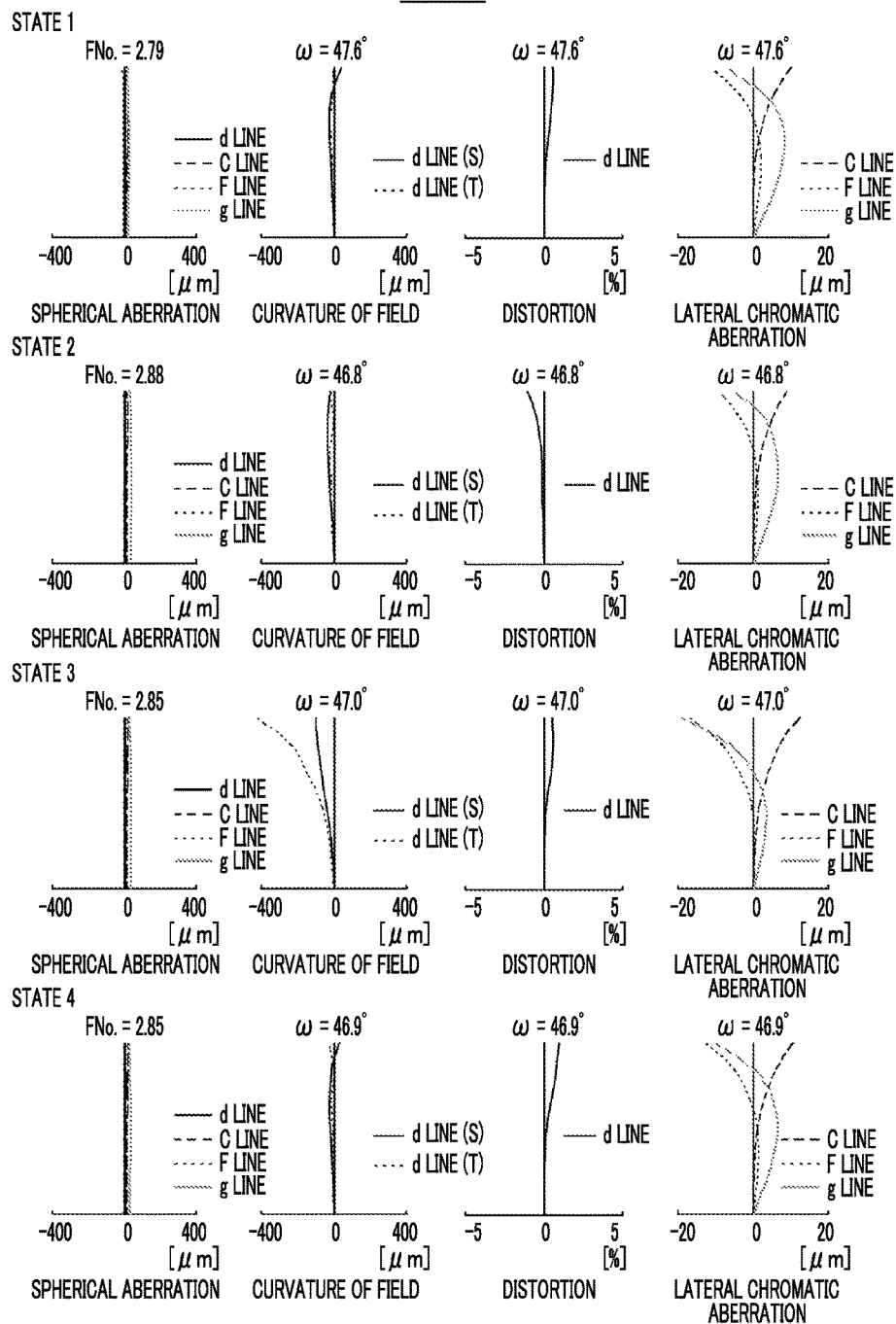
FIG. 9 is a diagram of aberrations of the imaging lens of Example 4 of the present invention.

Table 10 shows basic lens data of the imaging lens of Example 4, Table 11 shows specifications and variable surface spacings, Table 12 shows aspherical coefficients, and FIG. 9 shows a diagram of aberrations. State 1 to state 4 shown in FIG. 9 are the same as those in Example 1 described above, except that the amount of movement of the adjustment group GA during transition from the state 3 to the state 4 is 0.15f.

TABLE 10

| | | Example 4 | | |
|---|---|---|---|---|
| Si | Ri | Di | Ndj | vdj |
| 1 | 26.02839 | 3.507 | 1.85001 | 42.99 |
| 2 | 9.78646 | 3.847 | | |
| *3 | −300.80908 | 2.328 | 1.61881 | 63.86 |
| *4 | 13.71578 | 2.692 | | |
| 5 | 61.61008 | 3.760 | 1.51999 | 51.28 |
| 6 | −44.74492 | 0.873 | | |
| 7 | 20.47485 | 1.000 | 1.85001 | 42.99 |
| 8 | 8.90136 | 6.921 | | |
| 9 | 32.47988 | 3.302 | 1.72750 | 28.62 |
| 10 | −22.04767 | DD[10] | | |
| 11(St) | ∞ | 1.498 | | |
| 12 | −12109.84222 | 2.542 | 1.58157 | 61.87 |
| 13 | −16.26277 | 0.200 | | |
| 14 | 374.10601 | 4.379 | 1.85001 | 25.39 |
| 15 | 19.83154 | 0.200 | | |
| 16 | 16.33005 | 5.030 | 1.53342 | 63.73 |
| 17 | −8.50304 | 2.887 | 1.85000 | 22.50 |

TABLE 10-continued

Example 4

| Si | Ri | Di | Ndj | vdj |
|---|---|---|---|---|
| 18 | −24.61940 | DD[18] | | |
| *19 | 25.71531 | 4.553 | 1.58313 | 59.44 |
| *20 | −24.40781 | 5.000 | | |
| 21 | ∞ | 1.000 | 1.51633 | 64.14 |
| 22 | ∞ | 5.343 | | |

TABLE 11

Example 4

| | Infinity | 0.1 m |
|---|---|---|
| f' | 5.219 | 5.354 |
| FNo. | 2.79 | 2.88 |
| 2ω | 95.2 | 93.6 |
| Ymax | 5.5 | 5.5 |
| DD[10] | 7.649 | 6.351 |
| DD[18] | 0.200 | 1.498 |

TABLE 12

Example 4

| Surface Number | 3 | 4 | 19 | 20 |
|---|---|---|---|---|
| KA | 1.0000000E+00 | 1.0000000E+00 | 1.0000000E+00 | 1.0000000E+00 |
| A3 | −7.7249405E−20 | −1.2109924E−19 | 2.6020852E−19 | 4.9873300E−19 |
| A4 | 9.7609689E−04 | 8.7218007E−04 | −9.0366952E−05 | 1.0471714E−05 |
| A5 | 1.6859674E−05 | 6.4875907E−05 | −1.8275671E−05 | −1.7309504E−05 |
| A6 | −2.1900657E−05 | −2.1759689E−05 | 6.8332594E−06 | 4.3375959E−08 |
| A7 | −4.8159070E−07 | −2.2755600E−06 | 7.2054807E−07 | 2.2923868E−06 |
| A8 | 4.1187640E−07 | 3.2054560E−07 | −8.4666672E−07 | −4.6174299E−07 |
| A9 | 1.4451245E−08 | 4.1003350E−08 | 7.2989016E−08 | −5.1157975E−08 |
| A10 | −6.8752759E−09 | −4.1202298E−09 | 3.2321192E−08 | 1.9900536E−08 |
| A11 | −2.9653851E−10 | −3.9921052E−10 | −4.6958756E−09 | 1.1904386E−10 |
| A12 | 9.4176188E−11 | 5.6030544E−11 | −6.5329759E−10 | −4.0916173E−10 |
| A13 | 3.8333992E−12 | −2.2351892E−12 | 1.1325232E−10 | 1.4598327E−11 |
| A14 | −9.5825786E−13 | −1.2804451E−12 | 8.5118555E−12 | 4.1323605E−12 |
| A15 | −3.1573376E−14 | 1.1024368E−13 | −1.3947932E−12 | −2.6516002E−13 |
| A16 | 6.5373155E−15 | 2.2457018E−14 | −7.6828556E−14 | −1.2032563E−14 |
| A17 | 1.5044117E−16 | −1.1077057E−15 | 8.7160323E−15 | 1.8936448E−15 |
| A18 | −2.6676862E−17 | −1.9650344E−16 | 4.3490773E−16 | −9.9050806E−17 |
| A19 | −3.1139831E−19 | 3.5972140E−18 | −2.1918723E−17 | −5.0113156E−18 |
| A20 | 4.9716794E−20 | 6.7406876E−19 | −1.1075058E−18 | 6.0479540E−19 |

EXAMPLE 5

Figure 5:
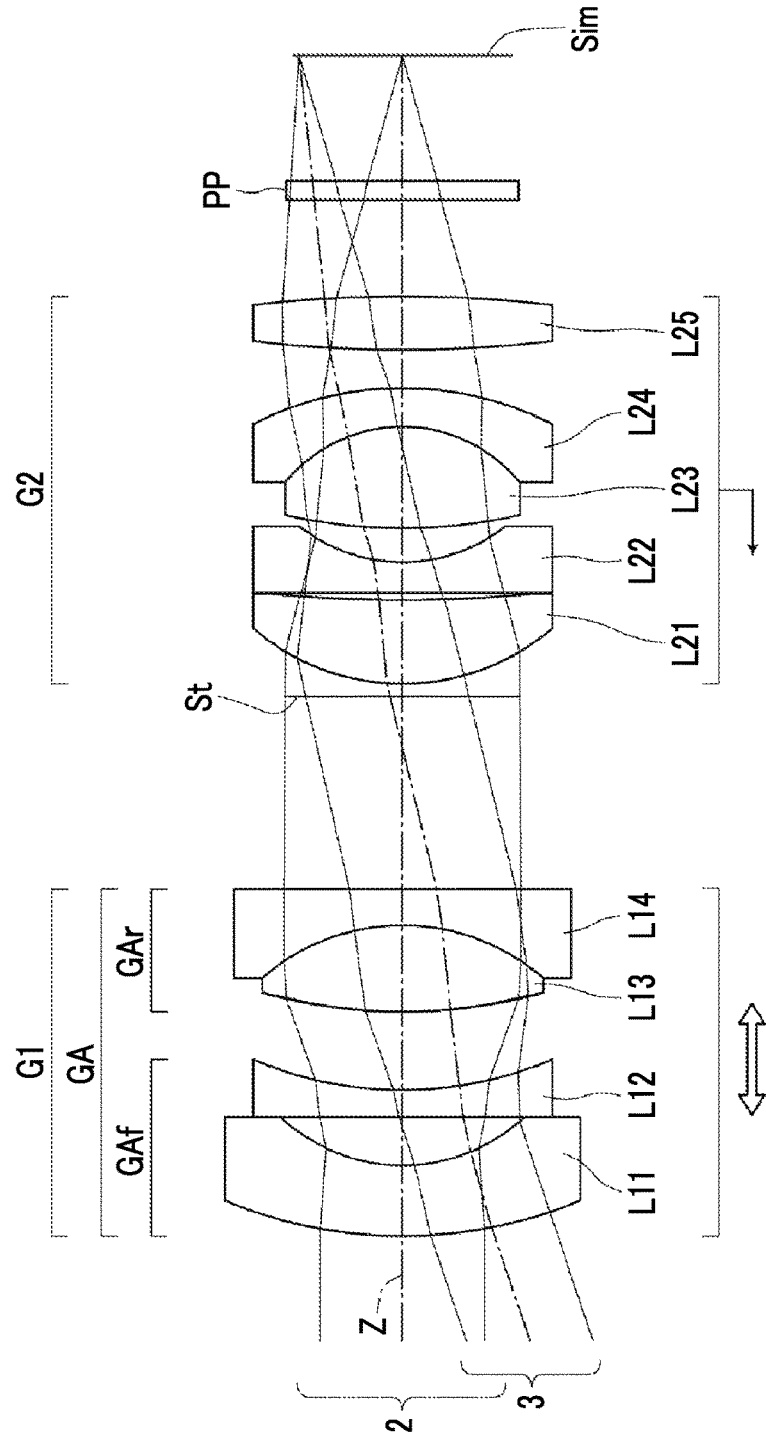
FIG. 5 is a cross-sectional view illustrating a configuration and an optical path of an imaging lens of Example 5 of the present invention.

FIG. 5 shows a cross-sectional view of a lens configuration and an optical path of an imaging lens of Example 5. The imaging lens of Example 5 has a rear focus type adopted therein, and the group configuration thereof and the number of lenses constituting each lens group are the same as those in Example 2.

Figure 10:
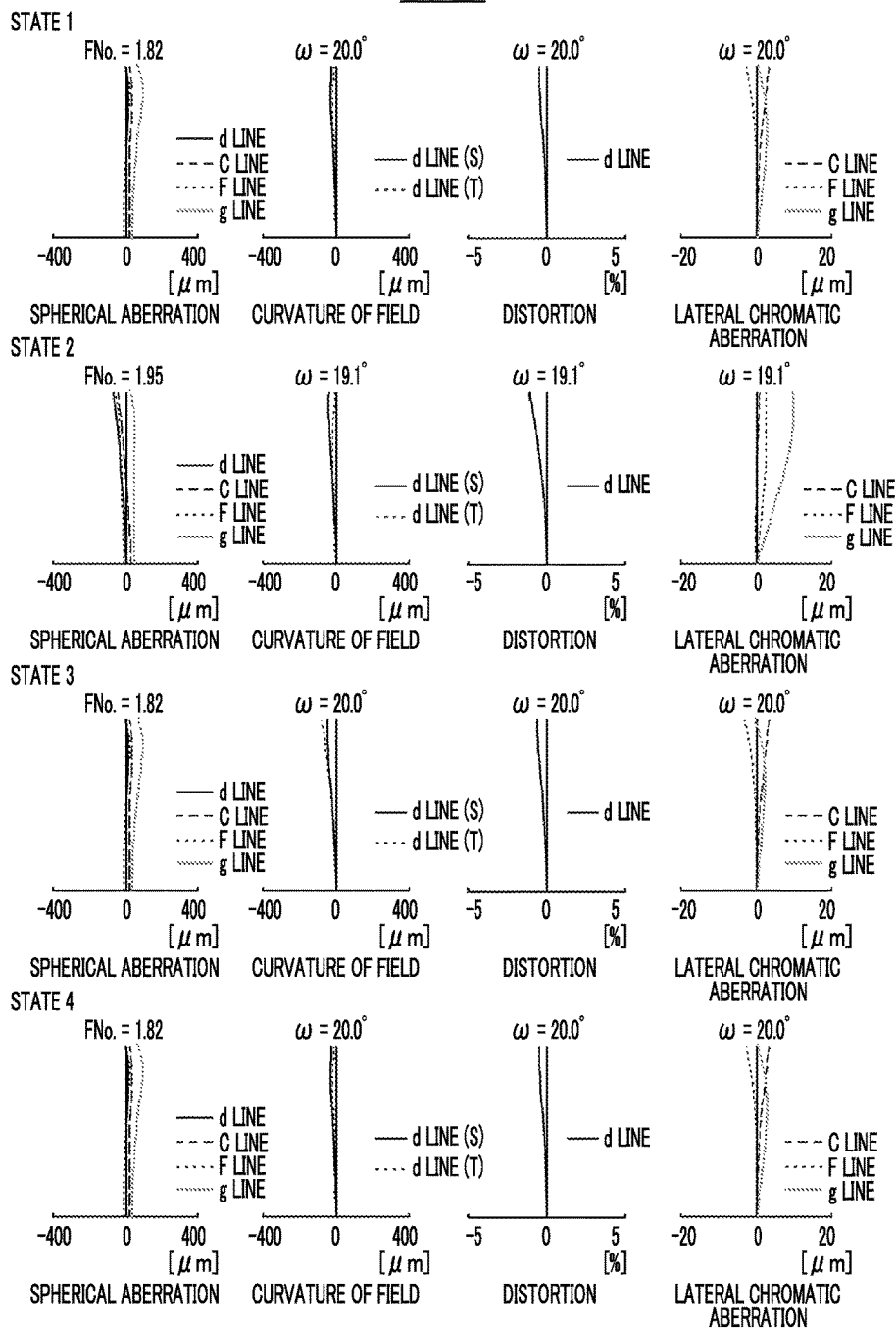
FIG. 10 is a diagram of aberrations of the imaging lens of Example 5 of the present invention.

Table 13 shows basic lens data of the imaging lens of Example 5, Table 14 shows specifications and variable surface spacings, and FIG. 10 shows a diagram of aberrations. State 1 to state 4 shown in FIG. 10 are the same as those in Example 1 described above, except that the amount of movement of the adjustment group GA during transition from the state 3 to the state 4 is 0.04f'.

TABLE 13

Example 5

| Si | Ri | Di | Ndj | vdj |
|---|---|---|---|---|
| 1 | 25.43557 | 3.700 | 1.64705 | 33.79 |
| 2 | 9.66138 | 2.515 | | |
| 3 | ∞ | 1.400 | 1.59812 | 61.22 |
| 4 | 20.82978 | 4.059 | | |
| 5 | 28.61058 | 4.500 | 1.93978 | 34.03 |
| 6 | −11.63886 | 1.919 | 1.73858 | 28.07 |
| 7 | −4336.58091 | DD[7] | | |
| 8(St) | ∞ | 0.650 | | |
| 9 | 12.47873 | 4.400 | 1.88911 | 39.10 |
| 10 | 78.86480 | 0.361 | | |
| 11 | ∞ | 1.600 | 1.62994 | 35.02 |
| 12 | 9.00448 | 1.775 | | |
| 13 | 29.67057 | 5.260 | 1.56878 | 62.30 |
| 14 | −8.19600 | 2.000 | 1.92384 | 18.81 |
| 15 | −18.05102 | 2.000 | | |
| 16 | 72.09957 | 2.800 | 2.00001 | 26.98 |
| 17 | −72.09957 | DD[17] | | |
| 18 | ∞ | 1.000 | 1.51680 | 64.20 |
| 19 | ∞ | 6.515 | | |

TABLE 14

Example 5

| | Infinity | 0.1 m |
|---|---|---|
| f' | 15.868 | 15.859 |
| FNo. | 1.82 | 1.95 |
| 2ω | 40.0 | 38.2 |
| Ymax | 5.5 | 5.5 |
| DD[7] | 10.000 | 7.663 |
| DD[17] | 5.000 | 7.337 |

Table 15 shows values corresponding to Conditional Expressions (1) to (5) with respect to the imaging lenses of Examples 1 to 5. The values shown in Table 15 are based on the d line.

TABLE 15

| Expression Number | | Example 1 | Example 2 | Example 3 | Example 4 | Example 5 |
|---|---|---|---|---|---|---|
| (1) | f/fA | 0.023 | −0.016 | 0.017 | 0.004 | 0.006 |
| (2) | h1/h2 | 0.637 | 0.623 | 0.331 | 0.319 | 0.712 |
| (3) | (1/Ymax)·Σ(di/vi) | 0.015 | 0.012 | 0.036 | 0.039 | 0.024 |
| (4) | Ymax/fAf | −0.433 | −0.351 | −1.057 | −0.928 | −0.376 |
| (5) | dAfr/dA | 0.339 | 0.393 | 0.096 | 0.245 | 0.224 |

As can be seen from the above-mentioned data, the imaging lenses of Examples 1 to 5 are configured such that TL/Ymax in a case where a distance on the optical axis from the lens surface of the lens system closest to the object side to the image plane is set to TL and a maximum image height is set to Ymax is less than 13, and that a reduction in size is achieved. In addition, in the imaging lenses of Examples 1 to 5, it is possible to satisfactorily perform the adjustment of the field curvature while suppressing defocusing of the central portion of an imaging region, and high optical performance is realized by satisfactory correction of each aberration.

Figure 11:
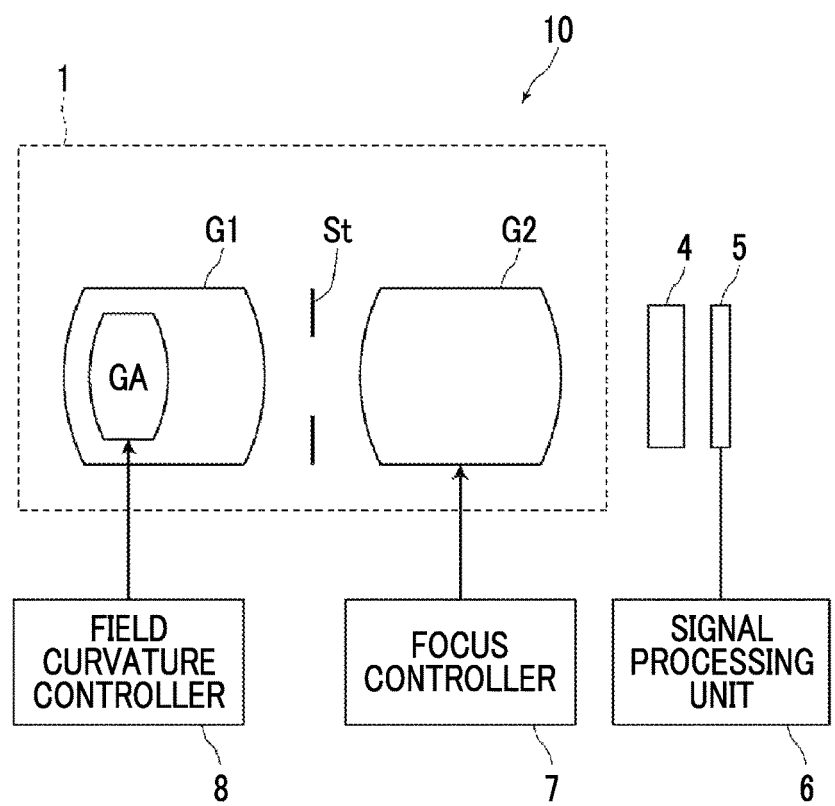
FIG. 11 is a schematic configuration diagram of an optical apparatus according to an embodiment of the present invention.

Next, an optical apparatus according to an embodiment of the present invention will be described with reference to FIGS. 11 and 12. FIG. 11 is a schematic configuration diagram of an optical apparatus 10 according to an embodiment of the present invention. Examples of the optical apparatus 10 include an FA camera, a digital camera, a film camera, a video camera, a surveillance camera, and a cinema camera. The optical apparatus 10 includes an imaging lens 1 according to an embodiment of the present invention, a filter 4 disposed on the image side of the imaging lens 1, an imaging device 5, a signal processing unit 6 that arithmetically processes an output signal from the imaging device 5, a focus controller 7 for performing focusing of the imaging lens 1, and a field curvature controller 8 for adjusting a field curvature of the imaging lens 1.

FIG. 11 conceptually shows a first lens group G1, an adjustment group GA, an aperture stop St, and a second lens group G2 which are included in the imaging lens 1. Meanwhile, FIG. 11 shows an example of a rear focus type in which the imaging lens 1 is configured as two groups, but the imaging lens 1 can also have a configuration different from this example adopted therein. The imaging device 5 captures an image of a subject formed by the imaging lens 1 to convert the captured image into an electrical signal, and, for example, a charge coupled device (CCD), a complementary metal oxide semiconductor (CMOS) or the like can be used as the imaging device. The imaging device 5 is disposed so that the imaging surface thereof is coincident with the image plane of the imaging lens 1.

Figure 12:
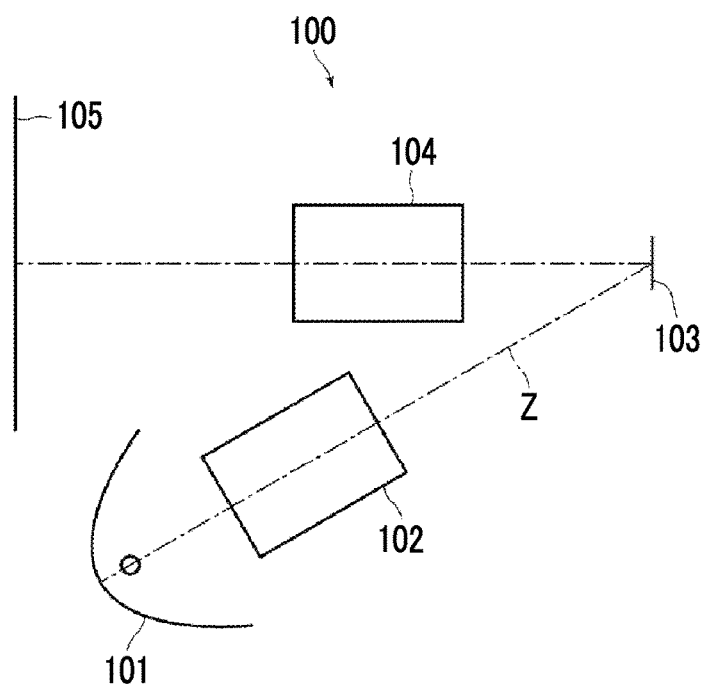
FIG. 12 is a schematic configuration diagram of an optical apparatus according to another embodiment of the present invention.

FIG. 12 is a schematic configuration diagram of an optical apparatus 100 according to another embodiment of the present invention. An example of the optical apparatus 100 includes a projection-type display device. The optical apparatus 100 shown in FIG. 12 includes a light source 101, an illumination optical system 102, a DMD (Digital Micromirror Device: Registered Trademark) 103 as a light valve, and an imaging lens 104 according to an embodiment of the present invention. Meanwhile, FIG. 12 schematically shows the respective components, and the focus controller and the field curvature controller shown in FIG. 11 are not shown. A light flux emitted from the light source 101 is selectively converted into each of three primary-color light beams in a time-series manner by a color wheel which is not shown in the drawing, has an achievement in the uniformity of light intensity distribution on a cross-section perpendicular to the optical axis Z of the light flux by the illumination optical system 102, and then is incident on the DMD 103. In the DMD 103, modulation switching to color light is performed in accordance with color switching of incident light. Light optically modulated by the DMD 103 is incident on the imaging lens 104. The imaging lens 104 projects an optical image based on this optically modulated light onto a screen 105.

Hereinbefore, the present invention has been described through embodiments and examples, but the present invention is not limited to the above-described embodiments and examples, and can be variously modified. For example, the radius of curvature, the surface spacing, the refractive index, the Abbe number, the aspherical coefficient, and the like of each lens are not limited to the values shown in each of the numerical value examples, and other values can be used therefor.

In addition, the above example illustrates the lens system in which focusing from an infinite object to a short-distance object is performed, but it goes without saying that the present invention can be applied to an imaging lens in which focusing from a finite long-distance object to a short-distance object is performed.

What is claimed is:

1. An imaging lens comprising, in order from a side closest to an object:
   a first lens group which is fixed to an image plane during focusing;
   a second lens group having a positive refractive power as a whole which moves from an image side to the object side during focusing from a long-distance object to a short-distance object,
   wherein a field curvature is adjusted by moving the entire first lens group or a sub-lens group within the first lens group including a lens closest to the object side, as an adjustment group, in a direction of an optical axis,
   a stop which is fixed to the image plane during the adjustment of the field curvature is disposed closer to the image side than the adjustment group, and
   the following Conditional Expressions (1) and (2) are satisfied, $$-0.05 < f/fA < 0.05 \qquad (1)$$

$$0.1 < h1/h2 < 0.9 \qquad (2)$$

where f is a focal length of the whole system in a state of being focused on an infinite object,
fA is a focal length of the adjustment group,
h1 is a height of a paraxial on-axis light ray on a lens surface of the adjustment group closest to the object side, and
h2 is a height of a paraxial on-axis light ray on a lens surface of the adjustment group closest to the image side.

2. The imaging lens according to claim 1,
wherein the adjustment group consists of a front group having a negative refractive power as a whole and a rear group having a positive refractive power as a whole, in order from the object side,
the front group and the rear group are separated from each other by an air spacing maximizing an absolute value of negative refractive power of the front group, and
the following Conditional Expression (3) is satisfied with respect to the whole lens constituting the front group, $$0 < \frac{1}{Y\max} \sum_{i=1}^{k} \frac{di}{vi} < 0.1 \qquad (3)$$

where Ymax is a maximum image height,
k is the total number of lenses included in the front group,
di is a central thickness of an i-th lens from the object side of the front group, and
vi is an Abbe number based on a d line of an i-th lens from the object side of the front group.

3. The imaging lens according to claim 2,
wherein the following Conditional Expression (3-1) is satisfied with respect to the whole lens constituting the front group.

$$0 < \frac{1}{Y\max} \sum_{i=1}^{k} \frac{di}{vi} < 0.04. \qquad (3-1)$$

4. The imaging lens according to claim 1,
wherein the adjustment group consists of a front group having a negative refractive power as a whole and a rear group having a positive refractive power as a whole, in order from the object side,
the front group and the rear group are separated from each other by an air spacing having a maximum absolute value of negative refractive power of the front group, and
the following Conditional Expression (4) is satisfied, $$-2 < Y\max/fAf < 0 \qquad (4)$$

where Ymax is a maximum image height, and
fAf is a focal length of the front group.

5. The imaging lens according to claim 4,
wherein the following Conditional Expression (4-1) is satisfied, $$-1.2 < Y\max/fAf < -0.2. \qquad (4-1)$$

6. The imaging lens according to claim 1,
wherein the number of lenses included in the adjustment group is equal to or less than five.

7. The imaging lens according to claim 1,
wherein the adjustment group consists of a front group having a negative refractive power as a whole and a rear group having a positive refractive power as a whole, in order from the object side,
the front group and the rear group are separated from each other by an air spacing having a maximum absolute value of negative refractive power of the front group, and
the following Conditional Expression (5) is satisfied, $$0.01 < dAfr/dA < 0.7 \qquad (5)$$

where dAfr is a distance on the optical axis between the front group and the rear group, and
dA is a distance on the optical axis from the lens surface of the adjustment group closest to the object side to the lens surface of the adjustment group closest to the image side.

8. The imaging lens according to claim 7,
wherein tthe following Conditional Expression (5-1) is satisfied, $$0.05 < dAfr/dA < 0.5 \qquad (5-1).$$

9. The imaging lens according to claim 1,
wherein the lens closest to the object side is a negative lens.

10. The imaging lens according to claim 1,
wherein the adjustment group consists of a front group having a negative refractive power as a whole and a rear group having a positive refractive power as a whole, in order from the object side,
the front group and the rear group are separated from each other by an air spacing having a maximum absolute value of negative refractive power of the front group, and
the front group includes two or more negative lenses.

11. The imaging lens according to claim 1,
wherein the following Conditional Expression (1-1) is satisfied, $$-0.03 < f/fA < 0.03 \qquad (1-1).$$

12. The imaging lens according to claim 1,
wherein the following Conditional Expression (2-1) is satisfied, $$0.3 < h1/h2 < 0.75 \qquad (2-1).$$

13. An optical apparatus comprising the imaging lens according to claim 1.

* * * * *